Patented Dec. 1, 1936

2,062,914

UNITED STATES PATENT OFFICE 2,062,914

MAGNESIUM SILICATE ELECTRICAL INSULATING COMPOSITION

Edgar Kunstmann, Berlin-Heinersdorf, Germany, assignor to Steatit-Magnesia Aktiengesellschaft, Berlin-Pankow, Germany No Drawing. Application October 4, 1933, Serial No. 692,145. In Germany February 21, 1933

13 Claims. (Cl. 106—12)

The invention relates to a method of reducing the dielectric loss of magnesium silicate masses.

Insulating parts consisting of porcelain and similar ceramic substances disclose high dielectric losses. Pure quartz glass and mica are practically free from loss but are not adapted for many uses where insulators are required. On the other hand, magnesium silicate masses produced from ground soapstone or talc, the so-called steatite masses can be used in almost any shape or place. Compared with other common ceramic substances, steatite discloses already a very low dielectric loss, but nevertheless sufficient loss to be objectionable to electrical engineering.

The invention makes it possible to reduce the dielectric loss of magnesium silicate masses of the kind mentioned still more, and in connection therewith to obtain other advantages of great importance.

Raw steatite material normally used for ceramic purposes contains generally from 70% to 90% of soapstone or talc. During burning, recrystallization and new crystallized compounds result which probably include magnesium metasilicate and orthosilicate or fosterite and christobalite. There is no doubt that the relatively low dielectric loss of the known steatite masses is due to the prevalence of these crystalline phases within the total mass.

However, in order to form a properly dense ceramic mass, it is usual to incorporate in the steatite batch clay and other oxides, particularly fluxing oxides. These materials have resulted in the production of a very material amount of glass in the fired product. This glass has an unfavorable effect electrically, noticeably increasing the dielectric loss. In order to reduce the dielectric loss, it has been discovered that it is necessary to obtain a mass having throughout a crystalline structure with no appreciable, and preferably no visible, glass between the crystals, and relatively large crystals are desirable. In order to accomplish this result, it has been found desirable to greatly reduce the amount of clay which has been generally employed in forming a steatite batch and to employ, instead of alkaline fluxes which produce glass, alkaline earth fluxes, the alkaline earth compounds preferably comprising at least 60% of the material in the batch other than steatite with the clay constituting not over 40% of the batch other than steatite. All oxides of the alkaline earths ranging from beryllium to barium may serve as alkaline-earth fluxes. A mass of special dielectric quality is obtained by introducing simultaneously two or more alkaline earths, e. g. calcium and barium compounds. Barium oxide will combine at different proportions with silicic acid and these combinations, like many barium compounds, possess an extraordinary capacity to crystallize. These barium silicates are capable of forming, with other alkaline earths, such as calcium silicates, in any proportion, mixed crystals and solid solutions.

A steatite mass according to the invention shows at 30 m. wavelength a power factor (cos $y$), of less than $4.10^{-4}$, i. e., a value approaching directly that of molten quartz, while the corresponding values of normal steatite masses built up with an ample amount of clay substance are at cos $y$ equal to about $8—15.10^{-4}$. The dielectric constant of the new steatite mass is approximately 6. Owing to their crystalline character, the mechanical strength of masses produced according to the invention is very great, measurements carried out with the 10 cm/kg Schopper hammer on rods having a length of 120 mms. and a cross section of 1—2 cm² disclosing a value of more than 4 cm/kg/cm².

There are steatite masses known already which contain both calcium oxide and aluminium oxide as sintering agents. The $CaO/Al_2O_3/SiO_2$ system, as is generally known, forms, however, a large number of eutectic mixtures and thus leads to the production of an ample amount of melt and, during solidification, of glassy portions which are avoided by the invention. The same applies to the use of any flux which results in a considerable amount of glass.

Of special importance is the possibility afforded by a special application of the new method of influencing the dielectric loss factor of ceramic bodies of the kind described in such a way that it varies considerably in the same sense as the wavelength and for this reason the bodies produced according to the invention will disclose, especially in the short-wave sphere where the losses are most troublesome, an extraordinarily low dielectric loss.

The dielectric loss factor of such ceramic bodies is more or less dependent on frequency, and masses are known whose dielectric loss factor varies in the same sense as the wave-length or in the opposite sense.

In the first-mentioned insulating bodies of known kind the reduction of the dielectric loss is not effected quickly enough with decreasing wavelength to satisfy the requirements of broadcasting engineering, particularly with respect to short waves say of 6 m. and less.

A surprising result is attained in this respect according to the invention if in preparing the mass as described barium oxide is introduced as alkaline earth addition, preferably alone or as a compound forming barium oxide during burning, and possibly while adding small amounts of clay substance if necessary.

How considerably the dielectric loss factor will thus be reduced with decreasing wavelength is indicated by the following values referring to a magnesium silicate mass without and with barium oxide content:

A *Magnesium silicate mass without barium oxide content*

| Wavelength | 300 | 150 | 75 | 25 | 6 | Reduction in per cent. between 300 and 6 ms. |
|---|---|---|---|---|---|---|
| Power factor $\cos \varphi \, 10^4$. | 10 | 9.5 | 9 | 8.5 | 7.5 | 25%. |

B *Magnesium silicate mass with barium oxide content*

| Wavelength | 300 | 150 | 75 | 25 | 6 | Reduction in per cent. between 300 and 6 ms. |
|---|---|---|---|---|---|---|
| Power factor $\cos \varphi \, 10^4$. | 6.6 | 5.5 | 4.3 | 3.3 | 2.8 | 57%. |

The fundamental idea of the invention and the main condition for its successful application can be summed up by stating that in masses of the kind described the formation of glassy constituents should be prevented as much as possible and a coarsely crystalline structure of crystals, as free as possible from glass, produced from magnesium and other alkaline earth silicates.

In the appended claims the term "clay" is intended to cover the broad class of materials as indicated in the foregoing description.

I claim:—

1. An insulating material consisting of from 70% to 90% magnesium silicate and the remainder chiefly of alkaline earth metal oxide compounds and clay, fired together, the alkaline earth metal compound, calculated as oxide, constituting at least 60% of said remainder.

2. An insulating material in accordance with claim 1, of crystals free from a detectable amount of material in the glass phase.

3. An insulating material in accordance with claim 1, and in which said oxide is of more than one alkaline earth metals.

4. An insulating material in accordance with claim 1, and in which said oxide includes barium oxide.

5. An insulating material in accordance with claim 1, and in which said oxide consists of barium oxide.

6. An insulating material consisting of from 70% to 90% magnesium silicate and a remainder consisting chiefly of alkaline earth metal oxide compounds and clay, the alkaline earth compound, calculated as oxide constituting at least 60% of said remainder, and all of said ingredients fired together to a crystalline phase.

7. An insulating material consisting of 70% to 90% magnesium silicate and the remainder of calcium compound, barium compound and clay, the alkaline earth compounds, calculated as oxides, constituting at least 60% of said remainder, and all of said ingredients fired together to a crystalline phase.

8. An insulating material consisting of 70% to 90% magnesium silicate, and barium compounds, calculated as oxide, constituting at least 60% of the remainder, all of said ingredients being fired together to a crystalline phase.

9. An insulating material consisting of 70% to 90% magnesium silicate and the remainder barium oxide, fired together to a crystalline phase.

10. An insulating material consisting of 70% to 90% magnesium silicate and the remainder consisting chiefly of alkaline earth metal compounds and clay, the amount of alkaline earth compounds calculated as oxides being at least 50% greater than the amount of clay, and said materials being fired together to the crystalline phase.

11. An insulating material consisting of 70% to 90% magnesium silicate and a remainder containing barium oxide fired together to a crystalline phase.

12. An insulating material consisting of 70% to 90% magnesium silicate and a remainder containing barium oxide and clay fired together to a crystalline phase.

13. An insulating material consisting of 70% to 90% magnesium silicate and a remainder containing barium oxide the barium compounds calculated as oxide constituting at least 60% of the remainder all of said ingredients being fired together to a crystalline phase.

EDGAR KUNSTMANN.